US010032153B2

(12) United States Patent
Luongo et al.

(10) Patent No.: US 10,032,153 B2
(45) Date of Patent: Jul. 24, 2018

(54) SYSTEM AND METHOD FOR ALLOCATING CHARGES AWAY FROM A TAX ACCOUNT

(71) Applicant: Stac Media, Inc., Greenwich, CT (US)

(72) Inventors: Pino Luongo, Greenwich, CT (US); William Gordon, New York, NY (US)

(73) Assignee: STAC IP, LLC, Wantagh, NY (US)

( * ) Notice: Subject to any disclaimer, the term of this patent is extended or adjusted under 35 U.S.C. 154(b) by 291 days.

(21) Appl. No.: 14/147,925

(22) Filed: Jan. 6, 2014

(65) Prior Publication Data
US 2015/0193757 A1 Jul. 9, 2015

(51) Int. Cl.
*G06Q 20/10* (2012.01)
*G06Q 20/20* (2012.01)

(52) U.S. Cl.
CPC .......... *G06Q 20/207* (2013.01); *G06Q 20/10* (2013.01); *G06Q 20/202* (2013.01)

(58) Field of Classification Search
CPC .................................................. G06Q 20/207
See application file for complete search history.

(56) References Cited

U.S. PATENT DOCUMENTS

| 5,694,596 | A | 10/1997 | Campbell |
| 5,937,405 | A | 8/1999 | Campbell |
| 6,240,451 | B1 | 5/2001 | Campbell et al. |
| 6,377,951 | B1 | 4/2002 | Campbell |
| 7,313,538 | B2 * | 12/2007 | Wilmes ................ G06Q 20/207 705/19 |
| 7,730,089 | B2 | 6/2010 | Campbell et al. |
| 7,809,614 | B2 | 10/2010 | Von Drehnen et al. |
| RE44,189 | E | 4/2013 | Brown et al. |
| 8,433,627 | B2 | 4/2013 | Agee et al. |
| 8,510,187 | B1 * | 8/2013 | Dinamani ............... G06Q 40/10 705/31 |
| 8,924,290 | B2 * | 12/2014 | Chmara ............... G06Q 20/202 705/14.1 |
| 2002/0052792 | A1 * | 5/2002 | Johnson ............... G06Q 20/207 705/19 |

(Continued)

OTHER PUBLICATIONS

Marotta, David John (Jun. 25, 2012) Are Investment Management Fees Tax Deductible, Forbes (hereinafter "Marotta").*

(Continued)

*Primary Examiner* — Peter Ludwig
(74) *Attorney, Agent, or Firm* — Leason Ellis LLP

(57) ABSTRACT

A transaction processing system suitable for processing a merchant transaction includes a computer having a processor, a memory, a plurality of connections over a network for receiving and settling the merchant transaction; and a separator module operative to separate funds associated with the merchant transaction. The separator module further includes a revenue settlement module operative to settle a revenue portion of the merchant transaction in favor of a first account accessible over the network, the first account being associated with the merchant; a tax settlement module operative to settle the tax portion associated with the merchant transaction in favor of a second account accessible over the network, the second account being different than the first account; and a fee resolution module operative to resolve fees associated with operation of the tax settlement module, such that an amount equal to the tax portion is settled in favor of the second account.

8 Claims, 7 Drawing Sheets

(56) References Cited

U.S. PATENT DOCUMENTS

| | | | |
|---|---|---|---|
| 2002/0111942 A1 | 8/2002 | Campbell et al. | |
| 2003/0093320 A1* | 5/2003 | Sullivan | G06Q 20/207 |
| | | | 705/19 |
| 2003/0097303 A1* | 5/2003 | Agee | G06Q 20/207 |
| | | | 705/19 |
| 2004/0181470 A1 | 9/2004 | Grounds | |
| 2005/0132035 A1 | 6/2005 | Campbell et al. | |
| 2005/0132059 A1 | 6/2005 | Campbell et al. | |
| 2005/0187842 A1 | 8/2005 | Grear et al. | |
| 2006/0036519 A1* | 2/2006 | Pfeiffer | G06Q 10/00 |
| | | | 705/30 |
| 2007/0194108 A1 | 8/2007 | Kalappa et al. | |
| 2008/0071703 A1* | 3/2008 | Evans | G06Q 10/10 |
| | | | 705/36 T |
| 2008/0089499 A1* | 4/2008 | Hahn | H04M 15/00 |
| | | | 379/114.2 |
| 2008/0120129 A1 | 5/2008 | Seubert et al. | |
| 2008/0249848 A1 | 10/2008 | Kay et al. | |
| 2008/0275737 A1* | 11/2008 | Gentry | G06Q 30/00 |
| | | | 705/3 |
| 2009/0055276 A1 | 2/2009 | Dunsmore et al. | |
| 2009/0076941 A1* | 3/2009 | Schneierson | G06Q 20/10 |
| | | | 705/37 |
| 2009/0240610 A1* | 9/2009 | Barsade | G06Q 20/04 |
| | | | 705/31 |
| 2010/0211493 A9 | 8/2010 | Harrison et al. | |
| 2012/0047034 A1* | 2/2012 | Luongo | G06Q 20/204 |
| | | | 705/15 |
| 2012/0150739 A1* | 6/2012 | Abeles | G06Q 20/102 |
| | | | 705/40 |
| 2012/0246038 A1 | 9/2012 | Wilmes et al. | |
| 2013/0013471 A1* | 1/2013 | Fishman | G06Q 40/00 |
| | | | 705/31 |
| 2013/0085913 A1* | 4/2013 | Luongo | G06Q 20/207 |
| | | | 705/31 |
| 2013/0191256 A1* | 7/2013 | Bleacher | G06Q 40/123 |
| | | | 705/31 |
| 2014/0006192 A1 | 1/2014 | Brown et al. | |

OTHER PUBLICATIONS

Hacienda (Puerto Rico department of Revenue), Sales Tax Automation Project—Management Presentation, undated (prior to Nov. 12, 2013, the filing date of the subject application), 26 pages.

The Federal Tax Authority, LLC, Fact Sheet, undated (prior to Nov. 12, 2013, the filing date of the subject application), 2 pages.

DAVO Technologies, "DAVO—Sales Tax," <<www.clover.com/appmarket/apps/BE89EAS9QYPMG>> (printed Mar. 18, 2015), 3 pages.

* cited by examiner

| | 24/B | |
|---|---|---|
| | Touch an item to see item commands | |
| | CAF/SOUP | $9.00 |
| | seat 1 | |
| | CAF/SOUP | $9.00 |
| | seat 2 | |
| | ++++++++++++ | $0.00 |
| | ++++++++++ | $0.00 |
| 1 | CAF/SAL, ROAST, BEETS | $8.50 |
| | DOS | |
| | seat 1 | |
| | CAF/SAL, CENTO, CAFE | $7.50 |
| | seat 2 | |
| | FIRE  $7.50 | $0.00 |
| ... | | |
| | Subtotal: | $34.00 |
| | Taxes: | $3.02 |
| | Total: | $37.02 |
| | Amount Due: | $37.02 |

Page 1 of 2

| 215983 | post | JAVIER PREG. | $45.02 |

SYSTEM AND METHOD FOR ALLOCATING CHARGES AWAY FROM A TAX ACCOUNT

FIELD OF INVENTION

The present invention relates to systems in support of commerce, and, more particularly, to a transaction processing system that is suitable for use by merchants, businesses and companies in the restaurant, hospitality, client services, wholesale, and retail industries, to manage tax and fee payments in connection with each tendered transaction.

BACKGROUND OF THE INVENTION

In the retail sector, customers purchase goods and services using cash, credit cards, or debit cards. While some purchases are not subject to taxation, most are. Food and beverage purchases in a restaurant, for example, can be subject to state and local sales taxes.

For each sales transaction that is subject to taxation, a merchant is legally obligated to pay tax at a rate that is set based on the location of the retailer. Thus, in New York City, there may be one rate, whereas in a suburban community outside New York City but still in the state of New York, there may be a different rate, whereas the same sales might not be subject to tax at all in a different state or during a state-sponsored promotional period to encourage shopping.

Merchants are obliged to collect tax from their customers. The collected tax is subject to voluntary reporting, yet the monies collected are co-mingled with other funds collected from operation of the retail enterprise. Meanwhile, the merchant has operating expenses in connection with running the business, such as payroll, inventory, rent, electricity, information services, franchise fees, and so on. It is important for the merchant to maintain accurate accounting records so that the business is not supported by tax revenue that is being held by the merchant until its next tax payment (typically, a monthly or a quarterly payment).

When the sales transaction is made in cash, the merchant receives monies sufficient to cover the sales price and any taxes collected from the customer. When the sales transaction is made by the customer tendering a transaction card (that is, either a debit or credit card), the merchant receives monies in the form of additions to its bank balance in the amount of the sales price and any taxes collected from the customer.

It would be an improvement in the art of such transaction processing to avoid co-mingling for as many sales transactions as possible. It would be a further improvement in the art if the tax revenue collected from a customer were not co-mingled with sales revenue collected by the merchant. Still a further improvement in the art would be a system that transfers to a taxing authority on an automated basis as much of the collected tax as possible substantially when the merchant's bank account is credited with the sales transactions with its customers. The present invention addresses these and other needs in the art.

SUMMARY OF INVENTION

In accordance with one aspect of the present invention, a transaction processing system suitable for a merchant in the restaurant, hospitality and retail industry includes a computer having a processor, a memory and a connection to a network, a card reader connected to the computer, and a plurality of modules each comprising code that executes in the processor. The card reader transfers credit card data from a credit card of a customer to the memory of the computer in a conventional manner. Among the plurality of modules, there is a check presentation module which is operative to configure the processor to calculate a sales tax associated with a price of a product sold to the customer. There is also an approval module which is operative to configure the processor to obtain an approval against the credit card data in the memory for at least the price of the product and the sales tax and thereby define an approved sale transaction. There are also a revenue settlement module and a tax settlement module, optionally, as part of a separator module.

The revenue settlement module is operative to configure the processor to settle a revenue portion of one or more approved sales transactions in favor of a first account accessible over the network and belonging to the merchant. The revenue portion excludes the sales tax portion. Meanwhile, the tax settlement module is operative to configure the processor to settle the sales tax associated with the one or more approved sales transactions in favor of a second account accessible over the network, wherein the second account is different than the first account.

In accordance with further broad aspects of the invention, a transaction processing system suitable for processing a merchant transaction comprises a computer having a processor, a memory, a first connection over a network for receiving the merchant transaction, and further connections over the network for settling the merchant transaction, and a separator module comprising code which, when executed in the processor, configures the processor to separate funds associated with the merchant transaction received over the first connection.

According to more particular aspects of the invention, the separator module can include a revenue settlement module operative to configure the processor to settle a revenue portion of the merchant transaction in favor of a first account accessible over the network, the first account being associated with the merchant, wherein the revenue portion excludes a tax portion of the merchant transaction; a tax settlement module operative to configure the processor to settle the tax portion associated with the merchant transaction in favor of a second account accessible over the network, the second account being different than the first account; and a fee resolution module operative to configure the processor to resolve at least one fee associated with operation of the tax settlement module, such that an amount equal to the tax portion is settled in favor of the second account.

In accordance with further aspects of the invention, the fee resolution module can be configured to appropriate funds from an alternative source equal to the at least one fee; and augment the second account with the appropriated funds in the event that the at least one fee is drawn from either the tax portion or the second account. Furthermore, the alternative source can be the revenue portion, the first account, and/or a predetermined third account. In a further aspect of the invention, the fee resolution module can be configured to isolate the tax portion from being subject to a disbursement of the at least one fee during operation of the tax settlement module; and discharge the at least one fee by either notifying a requester of the at least one fee to draw the at least one fee from an alternative source or by providing the requester with the fee from the alternative source.

In yet a further aspect of the invention, the fee resolution module can be configured to determine, prior to operation of the tax settlement module, a fee resolution estimate representing an amount estimated to be associated with operation of the tax settlement module; appropriate funds equal to the fee resolution estimate from an alternative source; and augment the tax portion with the appropriated funds prior to a disbursement of the at least one fee. The fee resolution module can be further configured to monitor the second account for a predetermined period of time after processing the merchant transaction; and augment the second account with funds appropriated from an alternative source equal to any fees deducted from the second account after processing the merchant transaction. The transaction processing system can be further configured to settle, by the revenue settlement module, the revenue portion of a plurality of merchant transactions simultaneously in a batch. Similarly, the transaction processing system can be further configured to settle, by the tax settlement module, the tax portion of a plurality of merchant transactions simultaneously in a batch.

According to yet another broad aspect of the invention, a method for providing a transaction processing system suitable for processing a merchant transaction, the system including a computer having a processor, a memory, a first connection over a network for receiving the merchant transaction, and further connections over the network for settling the merchant transaction, and a separator module comprising code which, when executed in the processor, configures the processor to separate funds associated with the merchant transaction received over the first connection, is described.

In accordance with more particular aspects of the invention, the method includes settling, by the separator module executing in the processor, a revenue portion of the merchant transaction in favor of a first account accessible over the network, the first account being associated with the merchant, wherein the revenue portion excludes a tax portion of the merchant transaction; settling, by the separator module executing in the processor, the tax portion associated with the merchant transaction in favor of a second account accessible over the network, the second account being different than the first account; and resolving, by the separator module executing in the processor, at least one fee associated with operation of the tax settlement module, such that an amount equal to the tax portion is settled in favor of the second account.

In accordance with further aspects of the invention, the method can further include appropriating, by the separator module executing in the processor, funds from an alternative source equal to the at least one fee; and augmenting the second account with the appropriated funds in the event that the at least one fee is drawn from either the tax portion or the second account. Furthermore, the alternative source can be the revenue portion, the first account, and/or a predetermined third account. In a further aspect of the invention, the method can include isolating, by the separator module executing in the processor, the tax portion from being subject to a disbursement of the at least one fee during operation of the tax settlement module; and discharging, by the separator module executing in the processor, the at least one fee by either notifying a requester of the at least one fee to draw the at least one fee from an alternative source or by providing the requester with the fee from the alternative source.

In yet a further aspect of the invention, the method can further include determining, by the separator module executing in the processor, prior to operation of the tax settlement module, a fee resolution estimate representing an amount estimated to be associated with operation of the tax settlement module; appropriating funds equal to the fee resolution estimate from an alternative source; and augmenting the tax portion with the appropriated funds prior to a disbursement of the at least one fee. The method can further include monitoring, by the separator module executing in the processor, the second account for a predetermined period of time after processing the merchant transaction; and augmenting the second account with funds appropriated from an alternative source equal to any fees deducted from the second account after processing the merchant transaction. In still further aspects of the invention, the method can include settling, by the separator module executing in the processor, the revenue portion of a plurality of merchant transactions simultaneously in a batch. Similarly, the method can include settling, by the separator module executing in the processor, the tax portion of a plurality of merchant transactions simultaneously in a batch.

These and further aspects, features and advantages of the present invention will become more apparent from the following detailed description when taken in connection with the accompanying drawings which show, for purposes of illustration only, a preferred embodiment of the present invention.

BRIEF DESCRIPTION OF THE FIGURES

FIG. 3 depicts a customer invoice for a sales transaction that has not closed;

FIG. 4 depicts a screen shot of an interface configured to be used in connection with the invention to transfer revenue and tax portions of one or more sales transactions for discrete, non-comingled processing;

DETAILED DESCRIPTION OF CERTAIN EMBODIMENTS

By way of overview introduction, the present invention provides improvements in transaction processing by isolating sales revenue from any tax collected by the merchant, such as a merchant in the restaurant, hospitality or retail industry. By isolating the sales tax (or any other applicable tax or taxes) from the revenue portion of a sales transaction, the merchant can manage its business without risk of shortfalls that can result by having the sales tax comingled with sales revenue. This can be a vital improvement for some merchants who are not well schooled in accounting. Equally important, however, is the fact that the isolated tax stream can be provided to a taxing authority on a per-transaction, per-day, per-week, or per-month basis, for example, rather than on a quarterly basis, which is a great advantage to the taxing authority. Furthermore, the isolated tax stream can be protected from or otherwise reimbursed for any fees associated with the transfer of those funds which have been designated for the taxing authority.

Figure 1:
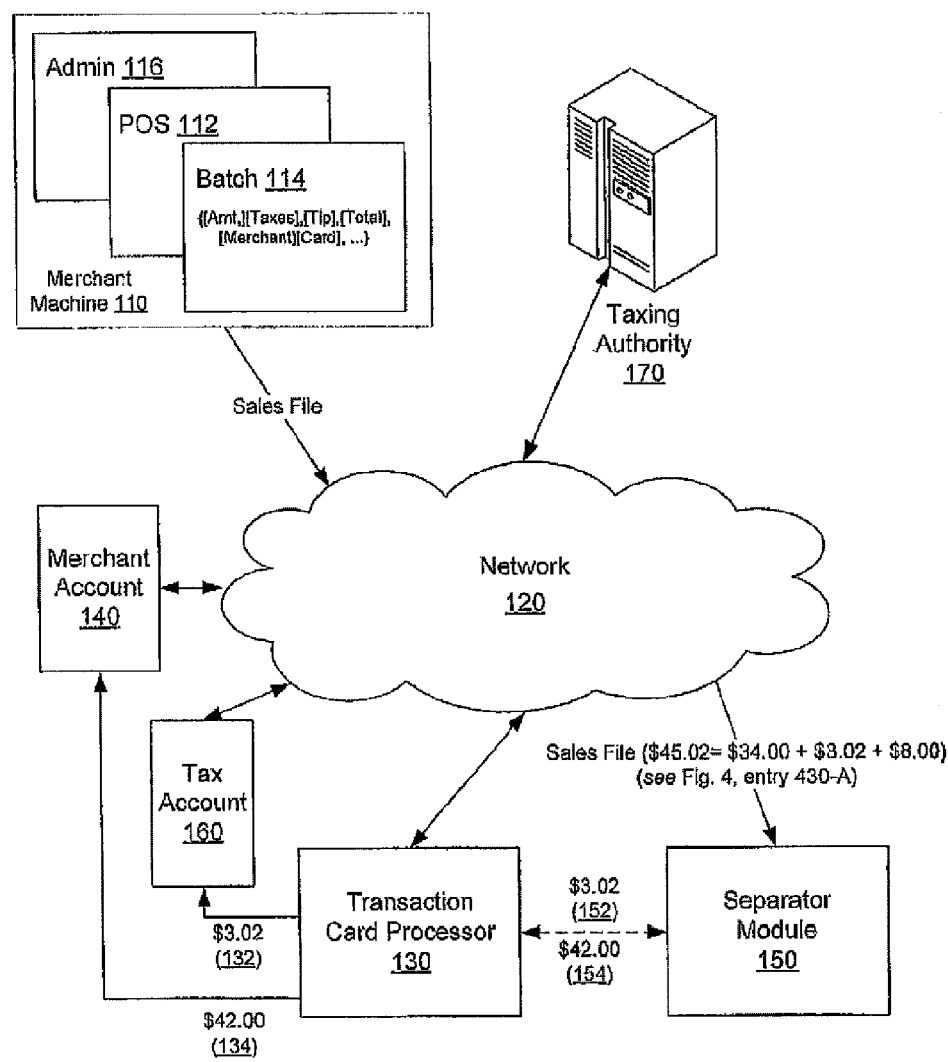
FIG. 1 illustrates a system arrangement in which a merchant machine connects to a transaction processing module, in accordance with one embodiment of the invention, prior to processing by a transaction card processor.

In FIG. 1, a merchant machine 110 comprises a computer system having network connectivity such as through a wired (e.g., 10/100 Ethernet) or wireless (e.g., IEEE 801.11g) connection to a network 120. The merchant machine includes a processor, memory, and conventional input/output devices such as a touch screen display. Code is loaded or otherwise accessible to the processor and executes to configure the processor as a point of sale device, in the case of POS module 112, or as a transaction processor in the case of Batch module 114, or as an editor in the case of the administrative module 116. Additional modules can be provided, as understood by those of skill in the art, so as to support interactivity with the touch screen or other input/output device, to support communications by and between the modules and over the network 120, to manage data, backups, reporting, and so on.

For instance, the code that comprises the POS module(s) 112 can comprise "Dinerware," by Dinerware, Seattle, Wash. This software provides a restaurant POS system featuring ticket handling, order routing, menus, business policies, labor management functionality, and so on. Other POS software can be used in the merchant machine 110 with equal advantage, including, by way of example and not limitation, "PointOS Professional" by PointOS, "Halo" by Vivonet, and "Cash Register Express" by PC America. As another example, the code that comprises the transaction module(s) 114 can comprise "Slipstream" by Midnite Express, Inc. of Myrtle Beach, S.C. The "Slipstream" software provides transaction processing system suitable for multiple credit card, gift, and loyalty card usage, including, in relevant part, batch processing of sales transactions to third-party transaction card processing facilities. The administrative module(s) 116 can comprise code that is a part of the POS or batch software, and generally designates functionality that can support configuration of the interface including the buttons and their labels, password management, licensing, setting of tax rates, pre-set gratuity levels, gift certificate processing, and other settings that the merchant might configure and save in a profile associated with a particular establishment or a chain of retail establishments.

Conventionally, the merchant machine 110 communicates over the network 120 to a transaction card processor 130 which receives a sales file output by the merchant machine and processes one or more sales transactions in the sales file so as to credit a merchant account 140 (which includes the data 430 in several rows of the interface 400). There are many transaction card processors 130 around the U.S.A. and all over the world that receive such files and perform merchant services such as processing third-party transactions and attending to interchange fees and other service charges, chargebacks and reversals, if any. For instance, First Data Merchant Data Services Corporation ("First Data"), 5th 3rd, Heartland, American Express CAPN, etc. The merchant account can be an account at any traditional or online banking institution. The merchant account 140 is characterized by having a routing number and an account number. Together, these numbers enable funds to be directed from the transaction card processor 130 to a particular account associated with the merchant.

Figure 5:
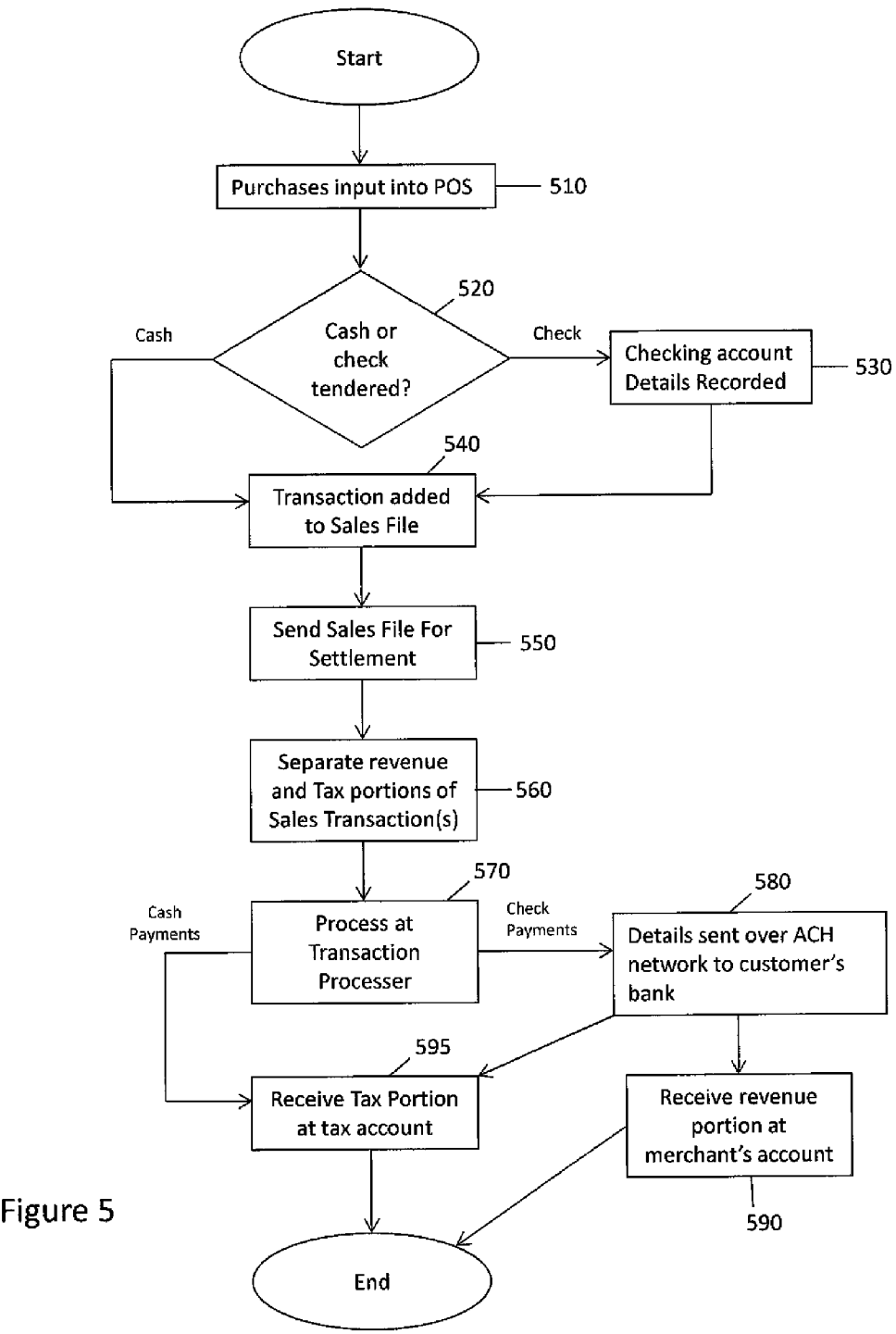
FIG. 5 depicts a flow diagram illustrating a tax settlement process in accordance with one or more embodiments of the invention.

It should be noted that while the embodiment described herein relates to merchant transactions conducted using a credit card or debit card, as is discussed in detail below in relation to FIG. 5, in instances in which a customer prefers to pay using cash or check the invention can similarly be performed using a suitably configured transaction processor in accordance with one or more embodiments of the invention that can process cash/check payments.

Figure 2:
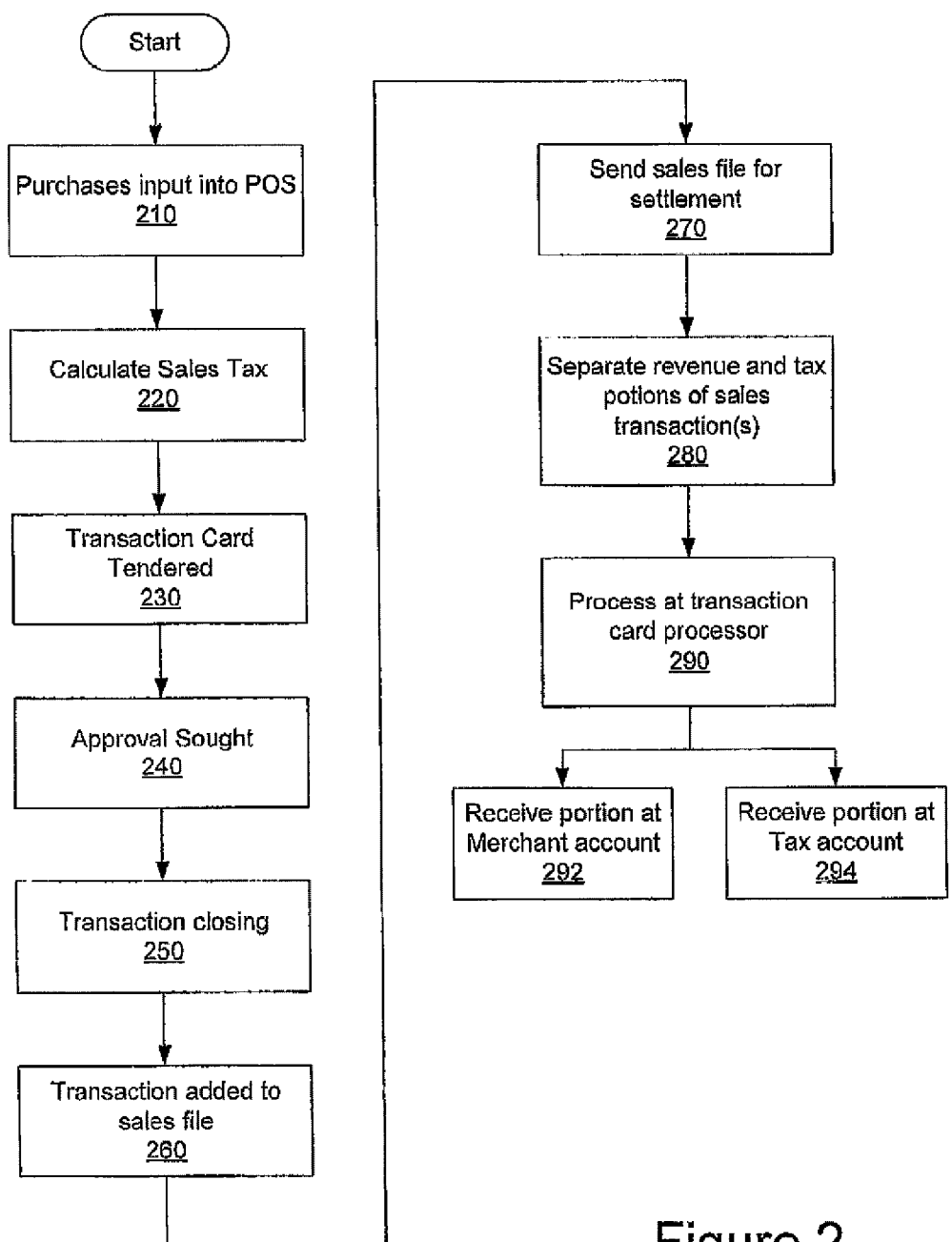
FIG. 2 depicts a flow diagram illustrating a process by which sales transactions are managed.

Turning briefly to FIG. 2, a first portion of a process flow 200 (steps 210 through step 270) illustrates a conventional sales transaction by a customer with a merchant using a credit card or signature-based debit card. A customer makes purchases at a merchant in a conventional manner. The purchase can be for goods or services. For instance, the purchase can be food (soup, appetizer, drink) from a restaurant. The customer's choices are input into a POS system at step 210. In FIG. 3, the POS system comprises the aforementioned Dinerware software that is executing for the benefit of the restaurant, such as in a machine located at the site of the restaurant. The purchases subtotal to $34.00. At step 220, tax is calculated such as by operation of a check presentation module comprising code executing in the machine that implements the POS in relation to the price of a product sold to the customer for the particular location of the retailer and/or the customer. The taxes are calculated (e.g., $3.02), and the calculated amount is added to the subtotal to yield a total amount due ($37.02 in the illustrated example).

If the customer tenders cash, the process continues as described below in connection with FIG. 5. However, when the customer wishes to pay using a transaction card, or several transaction cards as when the cost is split among several people, the transaction card is tendered as shown at step 230 by causing the card to be swiped or otherwise read (e.g., using a near-field RFID technology) or provided to the POS via an input device. More generally, a card reader is connected to the computer providing the POS functionality and the card reader transfers transaction card data from a credit card of a customer to a memory of the computer.

As indicated at step 240, approval of the tendered card is sought such as by communicating over the network 120 to a transaction card processor 130 associated with the particular card that was tendered (e.g., Visa, MasterCard, American Express, etc.). In a conventional manner, the card processor returns a code if the amount sought for approval is within the credit limit of the credit card, or within the parameters permitted for a debit card, if that was the card that was tendered. In the case of restaurants, the approval may be for an amount that exceeds the purchase amount ($37.02) to ensure that a gratuity (e.g., a 15%-20% overage) can be approved in case the customer adds a gratuity to the purchase amount as is customary for customers of some merchants. An approval module comprising code executing in the machine that implements the POS manages the actions necessary to communicate an amount to the transaction processor for approval against the transaction card data that has been read into the memory of the POS machine and to receive an acknowledgement of the approval. This amount, namely, at least the price of the product and the applicable tax or taxes (e.g., local, state, federal, etc.), defines an approved sale transaction. For online purchases, this can also include any associated shipping and/or handling costs. The acknowledgements can be stored locally at the merchant site or remotely, along with the sales transaction details with that customer. Among other data concerning the transaction that can be stored are the following (all of which can be part of a sales file later communicated to the transaction processor 130 for settlement):

[Date]
[Time]
[Check]
[User]
[Card]
[Card #]
[Approval]
[Amt.]
[Tax]

[Tip]
[Total]
[Tip %]
[Merchant]
[Other]

If the approval is obtained, then the process flow continues so as to close the transaction, as indicated at step 250. If approval is denied, the customer may be requested to provide alternate payment information, which can be received by the POS. Upon confirmation of the approval, a transaction closing module comprising code executing in the machine that implements the PUS operates to fix the total amount of the purchase, any tax, and any gratuities or costs that are being charged to the customer. The transaction closing module can close the sales transaction in an amount up to the approval defined in the approved sale transaction. That total amount, and some or all of the values of the variables listed above, are included in a row of a table or in a record or other data object that is included in a sales file that is communicated over the network 120 to a transaction card processor, typically at the request of the merchant, as indicated at step 270. The sales file is sent out, for example, by interacting with a settlement control 410 that is provided within the interface (see FIG. 4), or by any other appropriate form of electronic communication.

In accordance with various embodiments of the invention, the term "settlement" can be used to generally refer to the process in which a transaction is accepted for financial settlement between an issuing bank and a merchant's acquiring bank. The settlement process is a complex accounting process that ensures that interchange rates are applied, all participants in the transaction process have their fees applied and are paid, and the correct banking transfers are initiated to move funds from the issuing bank to all the relevant participants in the transaction.

The settlement control is selectable by a user of the transaction processing system (e.g., the POS) to trigger a revenue settlement module, a tax settlement module, or both, to cause a transmission over the network to settle the one or more approved sale transactions. The merchant selects a payment processor, such as one associated with the Visa and Mastercard tenders, for example, by interacting with a check box 420 and can, in a batch mode, send all transactions of that tender type at once, simultaneously (e.g., all of the illustrated transactions in a batch manager window 400). The sales transaction of FIG. 3 is shown in the first row, row 430-A, of FIG. 4. As will be understood from the description that follows, either or both a revenue portion of the sales transaction and applicable sales tax can be sent out by the code of the settlement module, simultaneously, in a batch.

Figure 4:
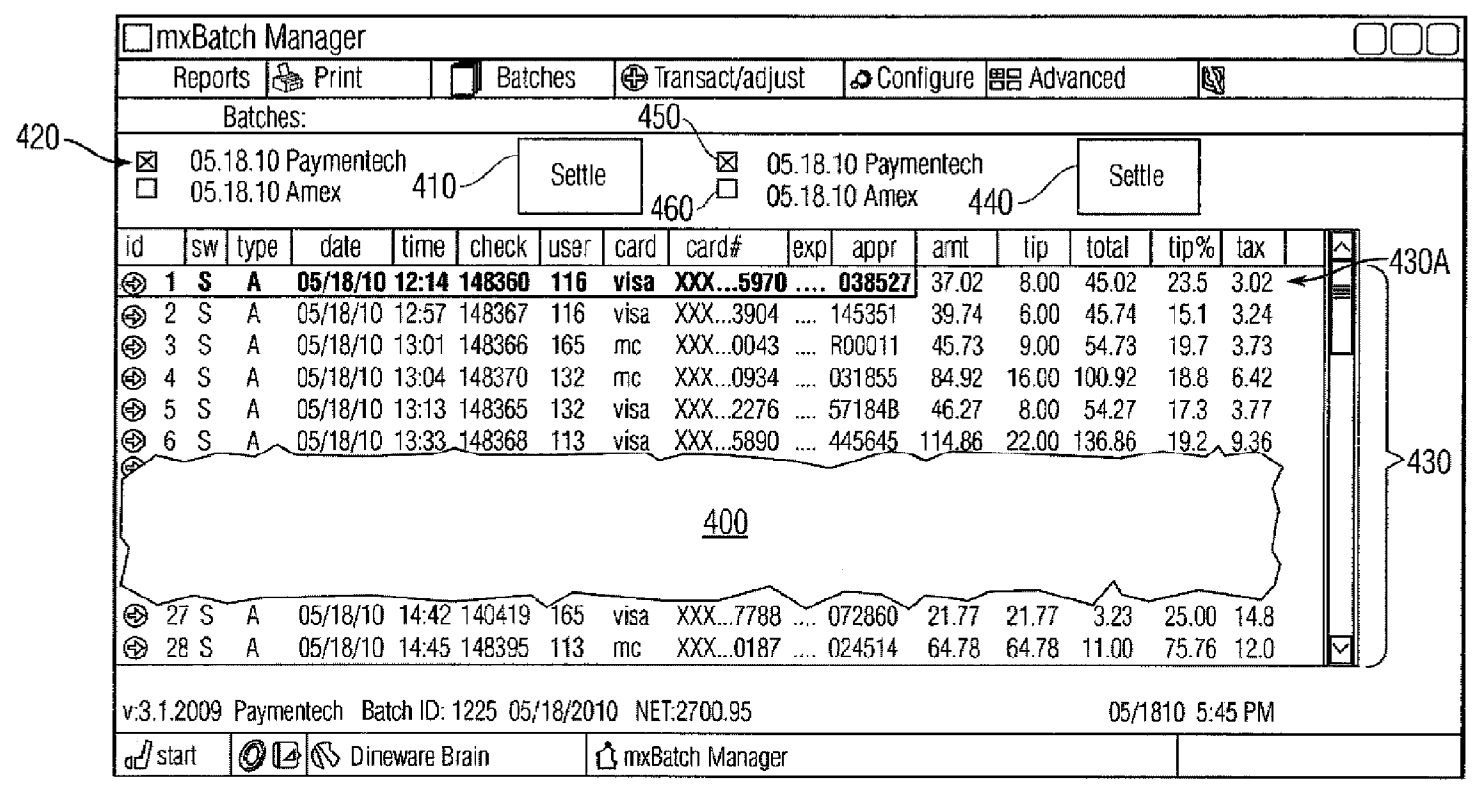

Referring now to FIGS. 1, 2 and 4, in accordance with a salient aspect of the invention, the sales file is processed by a separator module 150 which comprises code executing in a processor of a machine and operative to separate sales tax from a revenue portion of the sales transactions. It should be understood that the separator module can be executed on the machine that implements the POS, or can execute on a different machine accessible to the POS over the network 120. For instance, the functionality of the separator module can be a hosted solution that merchants can subscribe to in order to facilitate transaction card processing in a manner that eliminates co-mingling of sales or other applicable tax with operating revenue. The machine providing the hosted solution can be a machine of the transaction processor or of a third party. In should be noted that in instances where the separator module is part of a hosted solution, the POS can provide the separator module with the single data file over the network 120 for settling. In instances where the separator module is integrated with the POS, the separator module can process the sales file as described below, and then provide two data sets over the network 120 to the transaction processor 130 for settlement. In any implementation, the merchant transaction to be settled can transmit one or more account numbers and routing numbers to be used in the settlement of funds, or the recipient of the sales file can maintain (e.g., in an encrypted and/or otherwise secure manner) such information that can be retrieved from a data store and accessed using information in the sales file (e.g., the merchant identifier). The data store can be at the transaction processor or at the merchant, such as in the POS system, for example.

The code of the separator module 150 comprises a revenue settlement module that is operative to configure the processor of the machine on which it executes to settle a revenue portion of the approved sales transactions included in the sales file. The settlement is in favor of a first account that is accessible over the network, such as the merchant account 140 which belongs to the merchant. The revenue portion of the sales transaction excludes the sales tax, but can include any gratuity or tip, if applicable. (The purchase revenue and any gratuities are managed by conventional POS software, so that the merchant can divide tips among waiters and other staff according to their respective customers served, and/or in accordance with other business rules.) The code of the separator module 150 also comprises a tax settlement module that is operative to configure the processor of the machine on which it executes to settle any sales tax associated with the approved sales transactions in the sales file. The settlement in this regard is in favor of a second account accessible over the network, preferably one that is different than the first account. In one implementation, the settlement to the second account can be to an account of a taxing authority 170, such as tax account 160.

Optionally, when the separator module executes within the machine that implements the POS, the settlement control 410 can be configured to trigger a transfer to the transaction processor 130 just the revenue portion of the sales transaction(s), while a second control 440 can be provided and configured to trigger a transfer to the transaction processor 130 just the sales tax portion of the sales transaction(s). Each control can be for tenders of one type or another, such as Mastercard and Visa on the one hand by selecting check box 450 (as shown) or American Express by selecting check box 460.

At step 280, the separator module executes to provide to the transaction processor 130 two data sets, one designated to each of the first and second accounts. For instance, the separator module can include a routing number and an account number associated with each of the first and second accounts to the transaction processor 130. The transaction processor is thereby enabled to settle the transactions in the separated sales files to distinct accounts free of any co-mingling of sales tax with sales revenue.

The revenue settlement module and the tax settlement module each are preferably in communication with a database so that the transmission to the transaction processor 130 can forward data useful in settling the sales transactions. In one implementation, the communication to a database comprises the communication of the sales file message from the machine 110 of the merchant to the separator module 150. The sales file or database can provide an identifier of the first account; an identifier of the merchant that caused the transmission; an amount of the revenue portion of the one or more approved sales transactions; an amount of the sales tax associated with the one or more approved sales transactions; a date for each respective one of the one or more approved sales transactions; a time for each respective one of the one or more approved sales transactions; or a selection of these data.

At step 290, the third-party transaction processor receives from the separator module 150 at least two data sets, one concerning a revenue portion of one or more sales transactions and a sales tax portion of the same group of sales transactions. Referring again to the example in FIG. 3, if the communication from the separator module 150 is of one sales transaction rather than a batch of transactions, then the POS provides a sales file to the separator module and the separator module operates to output a divided or otherwise identified version of the sales file with portions suitable for settling both the sales revenue portion (arrow 152) and the sales tax portion (arrow 154). For instance, instead of settling the amount in the "Total" field as received from the POS, the fields can be remapped so that the Total, which is used by the transaction processor 130 has, in the case of the revenue portion, the sum of the Amt and Tip columns (and thus excludes the Tax column), and, in the case of the sales tax portion, the Tax column. In another implementation, the fields are unaltered, but the pertinent fields are identified to the transaction processor for settlement (that is, there is no re-mapping of the columnar data). In still another implementation, the Tax column data is omitted to cause a recalculation of the Total for use in settling the revenue portion of the sales transaction(s), and the Amt and Tip column data are omitted to cause a recalculation of the Total for use in settling the sales tax portion of the sales transaction(s).

Regardless of the approach taken, the transaction processor settles the sales transaction(s) so that the merchant account can receive at step 292 the revenue portion (arrow 134) and so that the second account 160 (e.g., tax account) can receive the sales tax component (arrow 132) of the sales transaction(s) at step 294. As such, the revenue settlement module and the tax settlement module can be understood as being configured, in accordance with the invention, to settle the revenue portion of the one or more approved sales transactions and the sales tax associated with the one or more approved sales transactions free of any comingling of those respective portions of the amount tendered by a customer in each closed sales transaction.

As mentioned above, in instances in which a customer prefers to pay using cash or check the invention can likewise be performed to prevent comingling of those respective portions of the amount tendered by a customer in each closed sales transaction (namely, the revenue portion and the tax portion), by employing a transaction processor configured by code executing therein to handle cash/check payments in a manner similar to the process described in relation to FIG. 2. For example, turning now to FIG. 5, at step 510, details of a purchase are input to a POS in a conventional manner. As described in step 220 of FIG. 2, the tax is calculated such as by operation of a check presentation module comprising code executing in the machine that implements the POS based on the price of a product sold to the customer for the particular location of the retailer and/or the customer.

At step 520, when the customer tenders cash or a check, the merchant may still desire to keep revenue and taxes from comingling. If a check is tendered (e.g., a personal check drawing on a personal checking account, a cashier's check, etc.), the checking account details (a routing number and an account number associated with the customer's form of payment) and the amount tendered are recorded at step 530. In a variation of the foregoing, the purchase can be by credit card, debit card, or other electronic payment (e.g., a NFC-enabled device payment) in the manner discussed above in connection with FIG. 2 using the modules discussed in connection with that Figure, while any further processing in view of the payment being by cash or check continuing as described here in connection with FIG. 5.

Recording can be accomplished by using an image capture device, such as a scanner or camera, or by entering the check details manually into the POS. At step, 540, the account details, as well as the purchase information, are added to the sales file. If cash (dollar bills and/or coins) is tendered, the purchase information and the amount tendered are similarly added to the sales file at step 540.

Continuing at step 550, the sales file is communicated over the network 120 to a transaction processor, typically at the request of the merchant. It should be noted that, depending on the system employed by the POS and the transaction processor handling the payment processing, a merchant may be required to generate separate files for cash transactions and checking transactions, and process each payment type separately if necessary. At step 560, the separator module executes to provide to the transaction processor two data sets generated from a single sales file, one designated to each of a first (merchant) account and a second (tax) account. The first data set can contain an amount to be transferred to the merchant account, and the second data set can contain an amount to be transferred to the account of the taxing authority. For instance, the separator module can provide a routing number and an account number associated with each of the first and second accounts to the transaction processor. The transaction processor is thereby enabled at step 570 to settle the transactions in the separated revenue and tax files to distinct accounts free of any co-mingling of sales tax with sales revenue.

It should be noted that for cash payments, because the merchant already has "cash-in-hand," once the cash sales file is separated into two data sets by the separator module, only the tax portion need be transferred from an account of the merchant (or a third party, such as a parent company) to an account of the taxing authority. Alternatively, however, the second data set representing the revenue portion can be configured by the separator module to specify zero (additional) dollars to be conveyed.

For check payments, at step 580 the transaction processor can send each of the data sets received from the separator module via a dedicated check processing network, such as the Federal Reserve's Automated Clearinghouse (ACH) network to the customer's bank for further processing. Upon receiving one or both data sets, as described above, the customer's bank will allocate funds from the customer's checking account and transfer those funds to each of the first (merchant) account (step 590) and a second (tax) account (step 595), in accordance with the content of the respective data sets. On the other hand, for a cash payment transaction, only the tax portion from any cash payment processed by the transaction processor is received at the account of the taxing authority.

As a consequence employing the herein described transaction processing system for either credit/debit card based purchases or cash/check based purchases, the second account has access to monies associated with a tax portion of the sales transactions at a merchant location substantially contemporaneously with the merchant having access to the monies. When the second account is one belonging to a taxing authority, the taxing authority obtains access to tax revenue on a daily, weekly, bi-weekly, or monthly basis rather than a quarterly basis. The merchant, meanwhile can be accorded read access to the second account, or another account that is linked to payments made through the second account, so as to monitor the amount of payments made, say, in a given calendar quarter, and so on.

Figure 6:
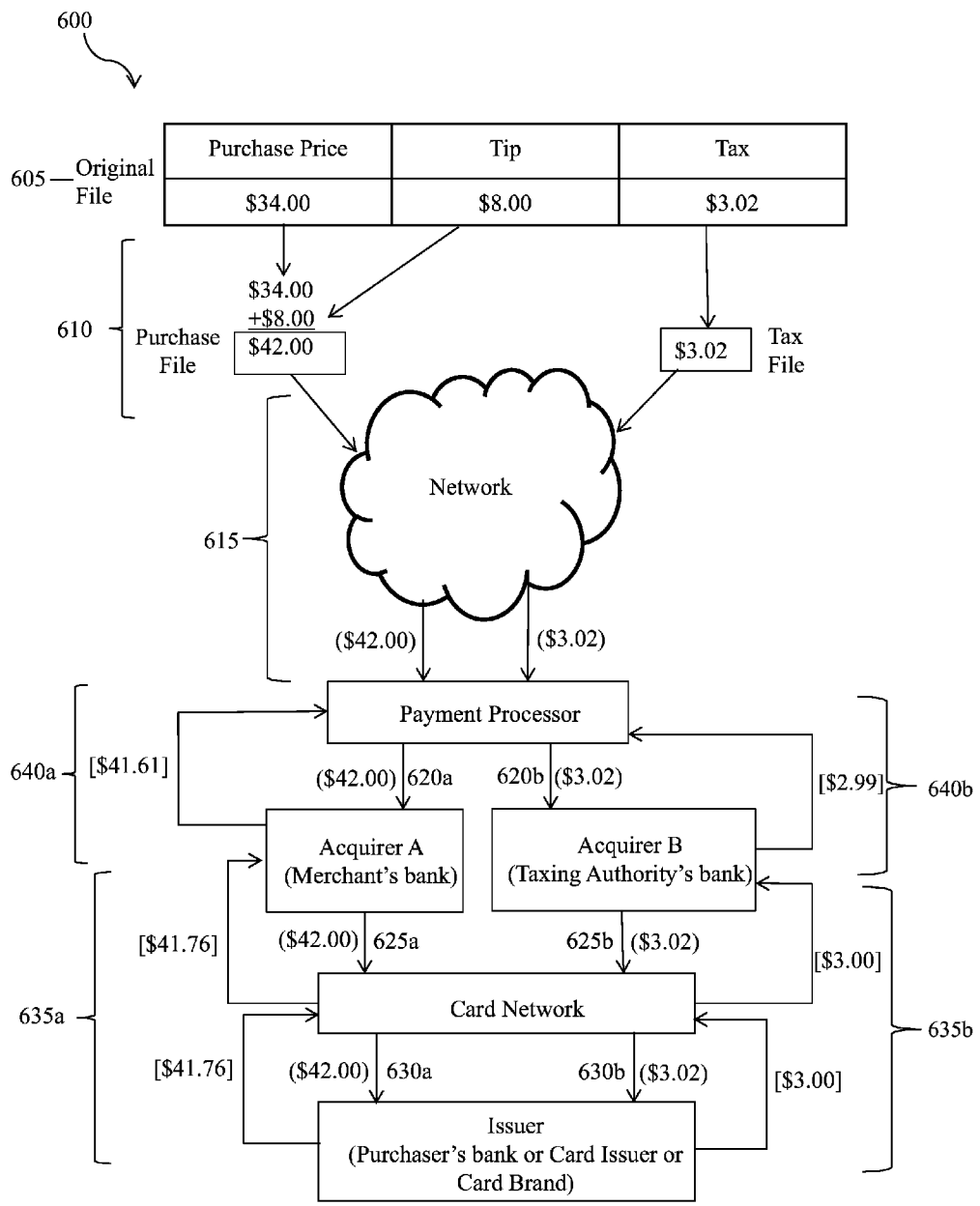
FIG. 6 depicts a flow diagram illustrating a process by which fees are assessed during certain sales transactions.

As discussed above, in conjunction with merchant services, an electronic payment processor such as transaction card processor 130 can process third-party transactions and attend to interchange fees and other service charges, chargebacks and reversals, if any. Such fees are often requested by the merchant's bank, the purchaser's (customer's) bank/card issuer, the credit card company/network, etc., and are typically assessed to the sales transaction as the funds are being transferred from the purchaser's account to any account that is to be funded. By way of example, flow process 600 of FIG. 6 shows one way in which the sales transaction settlement process of FIGS. 1-4 can be affected by the assessment of fees by various parties in the settlement process. At step 605, the transaction details of the example sales transaction of FIG. 3 are stored in the original sales file (as indicated on row 430A of FIG. 4). As discussed above (FIG. 2, step 280), at step 610 the separator module 150 can process the sales file so that the revenue portion—the purchase price and tip totaling $42.00—can be separated into a purchase file, and the tax portion—totaling $3.02—can be separated into a tax file. At step 615 the two files can be sent over network 120 to a payment processor such as transaction card processor 130 for further processing. As discussed in further detail below in relation to method 600 of FIG. 6, it should be understood that in alternative embodiments, such as in the hosted solution discussed above, a single data file including the revenue portion and tax portion can be sent by the merchant over network 120 or otherwise provided to the transaction processor having a separator module, at which time the revenue portion and tax portion can be separated and processed separately.

At steps 620a and 620b, the payment processor distributes the purchase file and the tax file to Acquirer A (the merchant's bank) and Acquirer B (the Taxing Authority's bank) respectively. Of course it is understood that Acquirer A and Acquirer B can actually be the same bank with two separate accounts, one for the merchant and one for the Taxing Authority. An acquirer is typically a bank or other financial institution that hosts an account to which funds are ultimately destined to be deposited at the end of an electronic sales transaction. The payment processor therefore provides each Acquirer with the amount to be requested from the issuer of the purchaser's bank/credit card by the Acquirer—indicated in FIG. 6 in parenthesis as ($42.00) and ($3.02), respectively. At steps 625a and 625b, Acquirer A and Acquirer B each send their respective requests to a card network, and the requests of ($42.00) and ($3.02) are then submitted to the Issuer at steps 630a and 630b. The card network acts as an intermediary between the Acquirer and the Issuer to authorize and settle credit card transactions, and can provide payment instructions as required.

Apart from the original transaction having been separated by the separator module into two files identifying distinct accounts and optionally distinct banks, the processing of the transaction can proceed in a conventional manner. It should be noted that while in the example embodiment described herein approval is sought for the total sales transaction amount prior to any bifurcation by the separator module (see FIG. 2, step 240), in other embodiments, approval can be sought for each of the tax portion and the revenue portion after bifurcation by the separator module. This is appropriate, for example, in instances where a customer chooses to make a payment using a PIN-based debit card or debit-linked NFC-enabled device (requiring a customer to enter a personal identification number at the POS), wherein a single communication is used for both authorization and settlement, rather than as separate processes.

The Issuer typically charges the merchant an interchange fee for each amount requested. An interchange fee is a fee paid by a merchant to a credit card issuer and a card network in exchange for accepting and handling credit card payments, and can be charged as a flat fee and/or a percentage of the requested amount. Interchange fees are commonly collected by the issuer and shared with the card network. In the example of FIG. 6, at step 635a, Issuer charges Acquirer A an interchange fee of 24¢ and sends the revised amount—indicated in square brackets as [$41.76]—via the card network to Acquirer A for settlement. Similarly, at step 635b, Issuer charges Acquirer B an interchange fee of 2¢ and sends the revised amount—indicated in square brackets as [$3.00]—via the card network to Acquirer B for settlement.

Once an acquirer receives a revised amount from an issuer, the acquirer then typically charges the merchant a discount fee. A discount fee is a processing fee paid by the merchant to the acquirer to reimburse the acquirer for the cost of processing the credit card payment. In the example of FIG. 6, at step 640a, Acquirer A charges the merchant a discount fee of 150, settles the payment with the merchant's account, and reports the revised amount—now [$41.61]—to the payment processor. Similarly, at step 640b, Acquirer B charges the merchant a discount fee of 10, settles the payment with the Taxing Authority's account, and reports the revised amount—now [$2.99]—to the payment processor. The payment processor thereafter can provide periodic statements (e.g., monthly, quarterly, etc.) to both the merchant and the Taxing Authority's bank, reflecting the transactions handled during a respective period.

In this example, the communications to and from the payment processor, the card network, the issuer, and any further intermediaries include information that traces the transaction back to the purchase file and the tax file, respectively, or comprise modifications to the purchase and tax files to track the status of the communications. Of course, this example does not include fees charged to the merchant by the payment processor for processing the sales transactions, any third-party fraud monitoring services, etc., which would also typically be subtracted from the funds issued by the issuer. It should be noted that even in other payment processing network configurations, such as if only one acquirer (for example, Acquirer A) was used initially to request the total amount ($45.02) of the funds from the issuer and then the tax portion was separated subsequently, there would still typically be fees associated with the transfer of those funds from Acquirer A to Acquirer B which could result in less than the total tax portion being deposited in the Taxing Authority's account.

Therefore, in accordance with further embodiments of the invention, separator module 150 can further include a fee settlement module (not shown), which comprises code that executes in a processor in order to provide the full amount of the tax portion of a sales transaction from the tax file at step 610 to the tax account 160. The fee settlement module operates to configure the processor of the machine on which it executes to settle any fees associated with the tax portion in favor of the revenue portion of the sales transaction.

Figure 7:
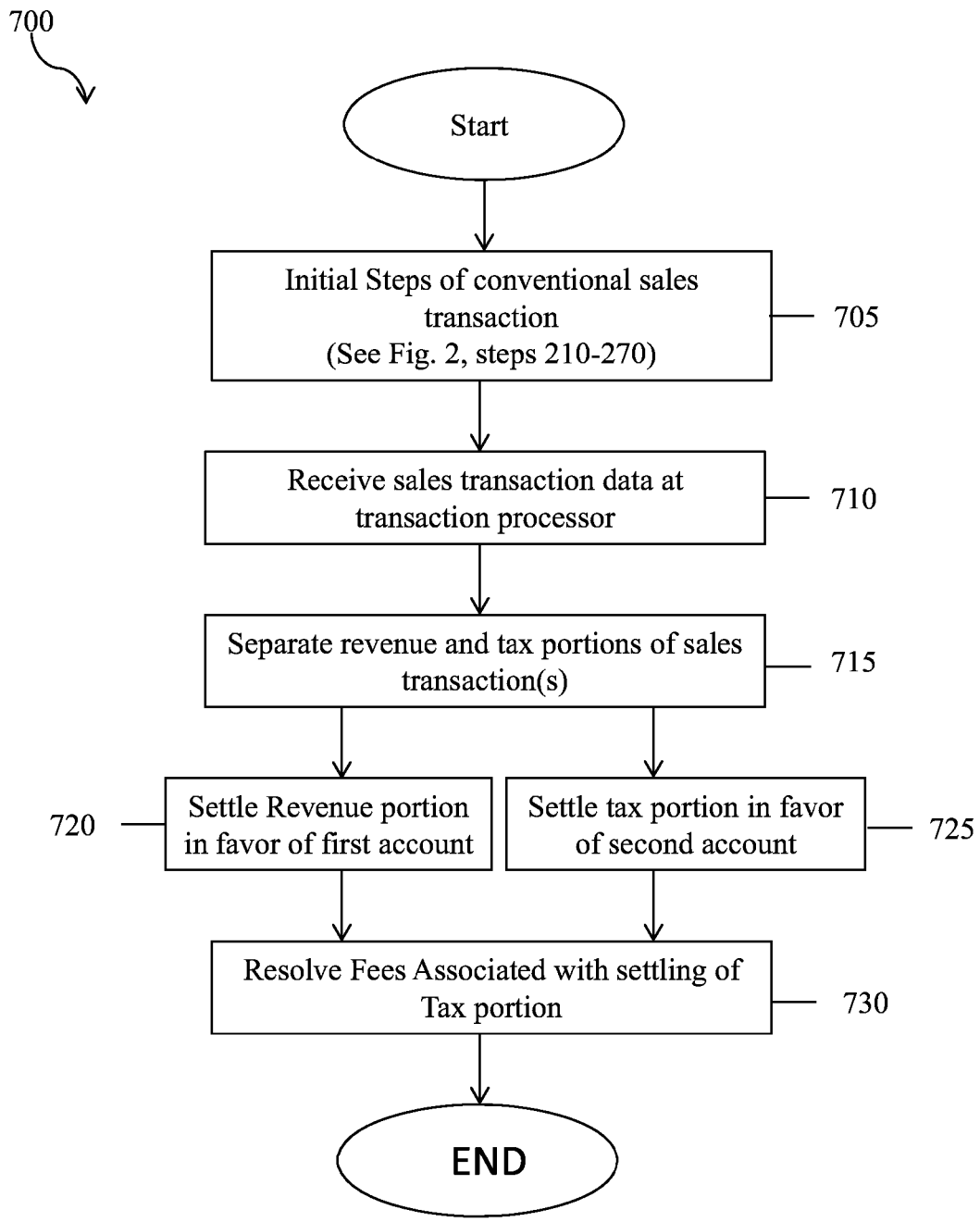
FIG. 7 depicts a flow diagram illustrating a fee settlement process in accordance with one or more embodiments of the invention.

Turning now to process flow 700 of FIG. 7, in accordance with embodiments of the invention, in step 705 a sales transaction can be conducted between a customer and a merchant using, for example, a credit card, as described above in detail regarding the first portion of process flow 200 (FIG. 2, step 210 through step 270). Alternatively, any other conventional electronic payment method can be employed, such as by using an NFC-enabled device, an online payment account, etc. As generally described above in relation to FIG. 1, at step 710 the merchant machine 110 communicates over the network 120 to a transaction processor which receives one or more sales file outputs by the merchant machine and processes one or more sales transactions in each sales file so as to credit merchant account 140 and tax account 160. In accordance with embodiments of the invention, depending on the configuration of the system and merchant/transaction processor network, sales transaction data can be received at the transaction processor for processing either as a single data file including both the revenue portion and the tax portion which is to be separated by the transaction processor as indicated in step 715, or can comprise two data files, each having already been separated into the appropriate amounts for the revenue and tax accounts by code executing in a merchant machine, such as the merchant POS, prior to receipt by the transaction processor.

At step 720, the revenue settlement module utilizes code executing in the processor of the machine on which it executes to settle the revenue portion in favor of merchant account 140. As discussed above, there are likely to be an assortment of fees associated with the revenue settlement, including interchange fees, discount fees, fraud-monitoring fees, etc. However, as these fees are drawn from the revenue that flows from the customer to the merchant by the various entities requesting the fees, and as the merchant is responsible for the payment of these fees, no further action is required by the separator module in settling the revenue portion.

At step 725, the tax settlement module utilizes code executing in the processor of the machine on which it executes to settle the revenue portion in favor of the tax account. However, unlike with the revenue portion, the merchant is responsible for paying the full amount of the tax portion that has been tendered by the purchaser (customer) during the sales transaction, and, in accordance with a salient part of this aspect of the invention, further code executes to ensure that the full amount is deposited in tax account 160. In particular, as indicated at step 730, the fee settlement module comprises code that configures the processor of the machine on which it executes to settle any fees associated with the tax portion so that an amount equivalent to the full tax portion paid by the purchaser is provided to tax account 160 notwithstanding any fees paid in connection with the processing of the card transaction. The fee settlement module can execute to provide such funds in a number of ways, a few of which are described below.

In accordance with embodiments of the invention, the fee settlement module can be configured to monitor the tax portion for any fees deducted during the settlement of the tax portion in favor of the tax account (during operation of the tax settlement module). Monitoring can be accomplished by tracking the stated amount of the tax portion as it is transferred from the Issuer to tax account 160, for example, by review the processes performed by the tax settlement module. Alternatively or additionally, fee settlement module can monitor tax account 160 directly and compare the amount posted to tax account 160 with the original tax portion and flag any discrepancies such as by storing in a memory the amount of the discrepancy and the tax account involved.

If the fee settlement module determines that a fee or fees have been deducted from the tax portion at any point during the tax settlement process (during operation of the tax settlement module), the fee settlement module can appropriate funds equivalent to the fee or fees from an alternative source to augment the tax account. The alternative source can be the revenue portion, in which case funds equivalent to a fee total can be diverted to tax account 160 rather than to merchant account 140. The alternative source can be merchant account 160, in which case funds equivalent to a fee total can be transferred from merchant account 140 to tax account 160 to compensate for the fees deducted. Finally, the alternative source can be a pre-determined third account that is designated to reimburse tax account 160 for any fees deducted from the fee portion. This can be an alternate account under the control of the merchant or may be that of a third-party, such as, for example, a third party payment processor that can bill the merchant later for any fees paid on the merchant's behalf to tax account 160. In any of these scenarios, the discrepancy that has been flagged can be matched to a user-configurable setting of the particular alternative source from which to satisfy the discrepancy, and the fee resolution module can initiate a transfer (or instruct a transfer) from that source in favor of the tax account.

In accordance with further embodiments of the invention, the fee settlement module can comprise additional code that configures the module to preemptively assess whether any fees are to be deducted from the tax portion by determining a fee resolution estimate. If the fee settlement module is so configured to define a fee amount that is to be deducted from the tax portion during the tax settlement of a given purchase transaction, then the fee settlement module subtracts the defined fee amount from the revenue portion to be requested from the Issuer and adds the defined fee amount to the tax portion. In this case, the tax portion will be processed through the network with sufficient additional funds to offset any fees to be deducted.

In the example of FIG. 6, the fees owing on processing the tax portion of the purchase transaction amounted to $0.03, and so the data files can be separated into $41.97 and $3.05 (instead of ($42.00 and $3.02 respectively) in order to better ensure that the final amount deposited to Acquirer B's account is the full tax amount of $3.02. However, the code executing in the fee resolution module can be further configured to account for the increase in the tax portion incurring further processing fees, such as in the case in which the tax portion is sizeable, and cause an incremental amount to be transferred beyond the fees due for the true tax portion to account for the incremental fees due to funding the tax portion to net the Acquirer B account at the full tax portion amount (e.g., to ensure $3.02 is funded). Additional processing fees in such an instance can be incurred based on a number of factors, such as the type of credit card tendered, the type of bank account(s) involved in the transaction, which financial institution is being used, the amount tendered, etc. Typically, each credit card company will set a scale or formula by which processing fees are to be assessed. Likewise for bank accounts, a "small-business" account may have one scale or formula associated with processing fees, whereas a "premium" account may have a different scale or formula associated with processing fees for the same transaction. Finally, different banking institutions may offer different processing fee scales or formulas, for example, as a way of attracting business. Processing fees may be a set amount, proportional, incremental (linear), exponential, and/or may be based on set ranges, tiers, thresholds, or any combination thereof.

The fee resolution module can therefore be further configured to account for the increase in the tax portion incurring further processing fees, by assessing the relevant processing fee structures associated with the transaction, determining whether processing the tax portion will cause such additional processing fees to be incurred and, if so, calculating the expected additional amount and resolving the additional processing fees by one of the methods described herein of fee resolution.

For example, two new cars may be sold for the same price ($27,000.00) by one merchant car dealer to two customers, Purchaser A and Purchaser B. If the sales tax on a new car sold by a merchant car dealer is 4%, the taxes assessed for each transaction will be $1,080.00. Purchaser A may tender a credit card for which additional processing fees are assessed on a $1.00-per-$100.00 formula for any tax portion above $100.00, with a cap at $15.00 in additional processing fees. The additional processing fees in this instance would be $9.00, to compensate for the $980.00 above the initial $100.00. Purchaser B, however, may tender a credit card for which additional processing fees are assessed based on a tiered scale, with the first $1000.00 assessed a flat rate of $10.00 in fees, and each additional dollar assessed a 5¢ charge, for a total of $14.00 in processing fees. Therefore, the fee resolution module can comprise additional code that configures the module to assess the relevant processing fee structures for each credit card tendered, determine whether processing the tax portion will cause such additional processing fees to be incurred and, if so, calculate the expected additional fees and resolving the additional processing fees by one of the methods described herein of fee resolution.

In the example above, for each transaction, upon detecting that additional processing fees will be incurred based on the credit card tendered, the fee resolution module is configured to calculate the expected fees and resolve the transactions accordingly. For the fees associated with Purchaser A's credit card, the additional processing fees are offset by separating the data files into $26,991.00 and $1009.00 (instead of ($27,000.00 and $1,000.00 respectively), in order to better ensure that the final amount deposited to the Taxing Authority's account is the full tax amount of $1,000.00 after the $9.00 processing fee is incurred. Likewise, the fee resolution module will resolve the transaction associated with Purchaser B's credit card by separating the data files into $26,986.00 and $1014.00 (instead of ($27,000.00 and $1,000.00 respectively) in order to better ensure that the final amount deposited to the Taxing Authority's-account is the full tax amount of $1,000.00 after the $14.00 processing fee is incurred.

The incremental fees may result in a saving of fees in the revenue account depending on the applicable fee schedule and the reduction in the amount in the revenue account. The final amount deposited in tax account 160, after operation of the fee settlement module, is equivalent to the amount paid by the customer in tax. This process is particularly convenient in embodiments in which the transaction processor receives a single data file and the separator module then separates the total amount into the revenue portion and the tax portion, because the defined fees and any incremental fees can likewise be separated and included with the tax portion prior to processing as part of a since separating procedure, and this can all be performed by the transaction processor without human intervention.

In accordance with yet further embodiments of the invention, the fee settlement module can be configured to isolate the tax portion from being subject to a disbursement of fees. This can be accomplished, for instance, by the fee settlement module designating the tax portion as a file from which no fees are to be taken. As requests or attempts are made to deduct fees from the tax portion, the fee settlement module can notify a requester of the fee or fees to draw the fee-equivalent funds from one of the alternative sources described above, or to automatically provide the requester with the fee-equivalent funds from the alternative source. Such collaboration can be prearranged between the merchant, transaction processor (if different than the merchant), the acquirer(s), the issuer, etc., so as to remove any encumbrances from impeding the process of successfully isolating the tax portion for settlement with tax account 160.

It should be noted that with any of the above described fee reimbursement processes, fees can be reimbursed on a per-fee basis as fees are deducted, or simultaneously in a batch, for example, once all fees have been deducted. Additionally, a batch of fees can be reimbursed for a single sales transaction or a batch of sales transactions, and fee reimbursement batches can be processed immediately or a later predetermined time, such as one per day, once per week, etc. Finally, it should be clear to those of ordinary skill in the art that the above described fee reimbursement processes can be employed to settle fees associated with the merchant's account in favor of alternative sources as well, for example, when the merchant's fees are paid by a parent company or franchisor.

In accordance with further embodiments of the invention, while tax and fee settlements can be enabled on a per-transaction basis or per-batch basis, transaction reports reflecting the myriad transactions handled by the transaction processing system can be generated periodically (e.g., daily, monthly, quarterly, etc.) For example, a merchant employing a software program as described above with regard to POS module(s) 112, can generate a transaction report reflecting all the merchant's transactions handled by the transaction processing system during a particular period, including all tax and fee related details.

Furthermore, in order to verify that the transaction processing system is properly processing the merchant transactions, the transaction processing system can further include a statement reconciliation module. The statement reconciliation module can be configured to receive two or more of the following: (a) merchant transaction reports, (b) merchant bank account statements, (c) payment processor reports, and/or (d) Taxing Authority (ACH) bank account statements (or, at minimum, the relevant information reflecting transactions with a particular merchant as provided by the Taxing Authority). The statement reconciliation module can compare the different data sets from the various statements/reports received, and flag any discrepancies. The statement reconciliation module can be further configured to reconcile any discrepancies between the data sets, and report the results to the merchant, payment processor, and/or the Taxing Authority. In doing so, merchants will be assured that they have delivered the correct tax revenue to the Taxing Authority, the payment processor will be assured that all fees have been paid, and the Taxing Authority will be assured that it has received the appropriate tax revenue from the merchant.

While certain features of the present invention have been described as occurring on a particular machine, it would be understood by one of ordinary skill in the art that the functions described herein can be performed by various machines, interconnected, and distributed over a network. The determination of which machines perform specific functions is determined by the specific software implementation and supported hardware platforms. Accordingly, the present invention can operate in a centralized environment, wherein a server is responsible for substantially all processing, and the clients display the virtual environment and communicate user-interaction to the server. Alternatively, the present invention can also be practiced in a peer-to-peer environment having little or no centralized processing, wherein the state of each client is shared with its peers as necessary and the simulation of the virtual environment is distributed across the peer network.

While the present invention has been described with respect to certain embodiments thereof, the invention is susceptible to implementation in other ways and manners which are still within the spirit of the invention. Accordingly, the invention is not limited to the described embodiments but rather is more broadly defined by the recitations in the claims appended thereto and equivalents of the recitations therein.

We claim:

1. A transaction processing system suitable for processing a merchant transaction with a transaction card, the system comprising:
    a computer having a processor, a memory, a first connection over a network for receiving the merchant transaction and associated transaction card information provided by the transaction card, one or more data files having information concerning the merchant transaction, and configured to initiate further connections over the network for settling the merchant transaction;
    a transaction processor in communication with the computer for settling the merchant transaction;
    a separator module comprising code stored in the memory which, when executed by the processor, configures the processor to separate funds associated with the merchant transaction received over the first connection, the separator module including:
        a revenue settlement module comprising code stored in the memory which, when executed by the processor configures the processor to settle a revenue portion of the merchant transaction in favor of a first account accessible over the network on a per-transaction basis, the first account being associated with the merchant, wherein the revenue settlement module processes the one or more data files to provide a first data set associated with the revenue portion which excludes a tax portion of the merchant transaction, and wherein the revenue settlement module provides the first data set to the transaction processor for settling one or more transaction fees associated with use of the transaction card in connection with the revenue portion of the merchant transaction;
        a tax settlement module comprising code stored in the memory which, when executed by the processor configures the processor to settle the tax portion associated with the merchant transaction in favor of a second account accessible over the network on a per-transaction basis, the second account being different than the first account, wherein the tax settlement module processes the one or more data files to provide a second data set associated with the tax portion, and wherein the tax settlement provides the second data set to the transaction processor for settling one or more transaction fees associated with use of the transaction card in connection with the tax portion of the merchant transaction; and
        a fee resolution module comprising code stored in the memory which, when executed by the processor configures the processor to resolve the one or more one transaction fees associated with operation of the tax settlement module on a per-transaction basis, such that an amount equal to the tax portion is settled in favor of the second account and wherein the second data set is designated to be offset or unchanged by the one or more transaction fees associated with operation of the tax settlement module, the fee resolution module being further configured to,
            determine, prior to operation of the tax settlement module, a fee resolution estimate representing an amount estimated to be associated with operation of the tax settlement module,
            appropriate funds equal to the fee resolution estimate from an alternative source, and
            augment the tax portion with the appropriated funds prior to a disbursement of the one or more transaction fees associated with use of the transaction card in connection with the tax portion, and
        wherein the fee resolution module is configured to settle the tax portion of the merchant transaction using the augmented tax portion such that the one or more transaction fees associated with use of the transaction card in settling the merchant transaction are offset or unchanged, free of any comingling between the revenue portion and the tax portion.

2. The transaction processing system as in claim 1, wherein the fee resolution module is configured to monitor the second account for a predetermined period of time after settling the merchant transaction to determine if funds were appropriated from the alternative source equal to any transaction fees deducted from the second account after settling the merchant transaction.

3. The transaction processing system as in claim 2, wherein the alternative source is at least one of the revenue portion, the first account, and a predetermined third account.

4. The transaction processing system as in claim 1, further configured to settle, by the revenue settlement module, the revenue portion of a plurality of merchant transactions simultaneously in a batch.

5. The transaction processing system as in claim 1, further configured to settle, by the tax settlement module, the tax portion associated with the second data set of a plurality of merchant transactions simultaneously in a batch.

6. The transaction processing system of claim 1, wherein the fee resolution module monitors the tax portion associated with the second data set directly and compares the amount posted to the second account with the tax portion and flags any discrepancies, wherein flagging discrepancies includes storing an amount of the discrepancy and the second account in the memory.

7. The transaction processing system of claim 6, wherein the fee resolution module is configured to match a flagged discrepancy to the alternative source and to initiate a transfer of funds equal to the amount of the flagged discrepancy from the alternative source in favor of the second account.

8. The transaction processing system as in claim 1, wherein the alternative source is at least one of the revenue portion, the first account, and a predetermined third account.

* * * * *